United States Patent
Khan et al.

(10) Patent No.: US 10,236,726 B2
(45) Date of Patent: Mar. 19, 2019

(54) JOINT SELECTION OF ANTENNAS AND TRANSMISSION POWER LEVEL FOR WIRELESS ENERGY TRANSFER

(71) Applicant: Facebook, Inc., Menlo Park, CA (US)

(72) Inventors: Talha Ahmed Khan, Austin, TX (US); Ali Yazdan Panah, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 103 days.

(21) Appl. No.: 15/294,692

(22) Filed: Oct. 15, 2016

(65) Prior Publication Data
US 2018/0109150 A1 Apr. 19, 2018

(51) Int. Cl.
*H02J 50/20* (2016.01)
*H02J 50/40* (2016.01)

(52) U.S. Cl.
CPC .............. *H02J 50/20* (2016.02); *H02J 50/40* (2016.02)

(58) Field of Classification Search
CPC .................................. H02J 50/20; H02J 50/40
See application file for complete search history.

(56) References Cited

U.S. PATENT DOCUMENTS

| | | | |
|---|---|---|---|
| 9,438,046 B1 * | 9/2016 | Leabman | H02J 5/005 |
| 9,450,449 B1 * | 9/2016 | Leabman | H04B 5/0037 |
| 2002/0058512 A1 * | 5/2002 | Mohebbi | H04B 7/022 455/442 |
| 2012/0244822 A1 * | 9/2012 | Kim | H02J 5/005 455/90.1 |
| 2016/0285519 A1 | 9/2016 | Gong et al. | |

OTHER PUBLICATIONS

S. Ulukus et al., "Energy harvesting wireless communications: A review of recent advances," IEEE J. Sel. Areas Commun., vol. 33, pp. 360-381, Mar. 2015.
S. Gollakota et al., "The emergence of RF-powered computing," Computer, vol. 47, pp. 32-39, Jan. 2014.
M. Pinuela et al., "Ambient RF energy harvesting in urban and semi-urban environments," IEEE Trans. Microw. Theory Techn., vol. 61, pp. 2715-2726, Jul. 2013.

(Continued)

*Primary Examiner* — Hal Kaplan
*Assistant Examiner* — Elim Ortiz
(74) *Attorney, Agent, or Firm* — Brian R. Short

(57) ABSTRACT

Apparatuses, methods, and systems for jointly selecting a plurality of antennas and a transmission power level, for transmitting a wireless energy transfer (WET) signal from a base station to a device are disclosed. One apparatus includes a base station, wherein the base station includes a plurality of N antennas configured to transmit and receive electromagnetic signals, and a controller connected to the plurality of N antennas through a plurality of RF (radio frequency) chains. The controller is configured to jointly select a plurality of M of the plurality of N antennas and a transmission power level, for transmitting a wireless energy transfer (WET) signal from the base station to a device based on an activation threshold of the device and a saturation level of the device.

19 Claims, 4 Drawing Sheets

(56) References Cited

OTHER PUBLICATIONS

C. Valenta and G. Durgin, "Harvesting wireless power: Survey of energy-harvester conversion efficiency in far-field, wireless power transfer systems," IEEE Microw. Mag., vol. 15, pp. 108-120, Jun. 2014.
X. Chen, X. Wang, and X. Chen, "Energy-efficient optimization for wireless information and power transfer in large-scale MIMO systems employing energy beamforming," IEEE Wireless Commun. Lett., vol. 2, pp. 667-670, Dec. 2013.
G. Yang, C. K. Ho, R. Zhang, and Y. L. Guan, "Throughput optimization for massive MIMO systems powered by wireless energy transfer," IEEE J. Sel. Areas Commun., vol. 33, pp. 1640-1650, Aug. 2015.
E. Bjrnson, L. Sanguinetti, J. Hoydis, and M. Debbah, "Optimal design of energy-efficient multi-user MIMO systems: Is massive MIMO the answer?," IEEE Trans. Wireless Commun., vol. 14, pp. 3059-3075, Jun. 2015.
E. Boshkovska, D. W. K. Ng, N. Zlatanov, and R. Schober, "Practical non-linear energy harvesting model and resource allocation for SWIPT systems," IEEE Commun. Lett., vol. 19, pp. 2082-2085, Dec. 2015.
R. Zhang and C. K. Ho, "MIMO broadcasting for simultaneous wireless information and power transfer," IEEE Trans. Wireless Commun., vol. 12, pp. 1989-2001, May 2013.
H. Q. Ngo, E. G. Larsson, and T. L. Marzetta, "Energy and spectral efficiency of very large multiuser MIMO systems," IEEE Trans. Commun., vol. 61, pp. 1436-1449, Apr. 2013.

\* cited by examiner

JOINT SELECTION OF ANTENNAS AND TRANSMISSION POWER LEVEL FOR WIRELESS ENERGY TRANSFER

FIELD OF THE DESCRIBED EMBODIMENTS

The described embodiments relate generally to wireless communications. More particularly, the described embodiments relate to systems, methods and apparatuses for jointly selecting a plurality of antennas and a transmission power level, for transmitting wireless energy transfer (WET) signals from a base station to a device.

BACKGROUND

Energy harvesting is an emerging technology for powering devices that can potentially help enable self-sustainable, autonomous and green systems. Further, RF (radio frequency) or wireless energy harvesting includes an energy harvesting device extracting energy from the incident RF signals.

It is desirable to have methods apparatuses, and systems for jointly selecting a plurality of antennas and a transmission power level, for transmitting a wireless energy transfer (WET) signal from the base station to a device based on an activation threshold of the device and a saturation level of the device

SUMMARY

An embodiment includes a base station. The base station includes a plurality of N antennas configured to transmit and receive electromagnetic signals, and a controller connected to the plurality of N antennas through a plurality of RF (radio frequency) chains. The controller is configured to jointly select a plurality of M of the plurality of N antennas and a transmission power level, for transmitting a wireless energy transfer (WET) signal from the base station to a device based on an activation threshold of the device and a saturation level of the device.

Another embodiment includes a method. The method includes transmitting, by one or more of a plurality of N antennas of a base station, an electromagnetic signal to a device, and jointly selecting, by a controller of the base station, a plurality of M of the plurality of N antennas and a transmission power level, for transmitting a wireless energy transfer (WET) signal from the base station to a device based on an activation threshold of the device and a saturation level of the device.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for wireless transfer of energy from a base station to a device. For an embodiment, the base station jointly selects a plurality of antennas and a transmission power level, for transmitting a wireless energy transfer (WET) signal from a base station to a device. For at least some embodiments, the base station determines an activation power level of the device and a threshold power level of the device, and jointly selects a plurality of antennas and a transmission power level based on the activation power level and the threshold power level of the device.

For an embodiment, the number of antennas and transmit power level are jointly selected to maximize the energy efficiency of the overall system, including the base station and the device. For an embodiment, the energy harvested by the device from wireless signals received from the base station is used by the device to communicate information back to the base station.

Figure 1:
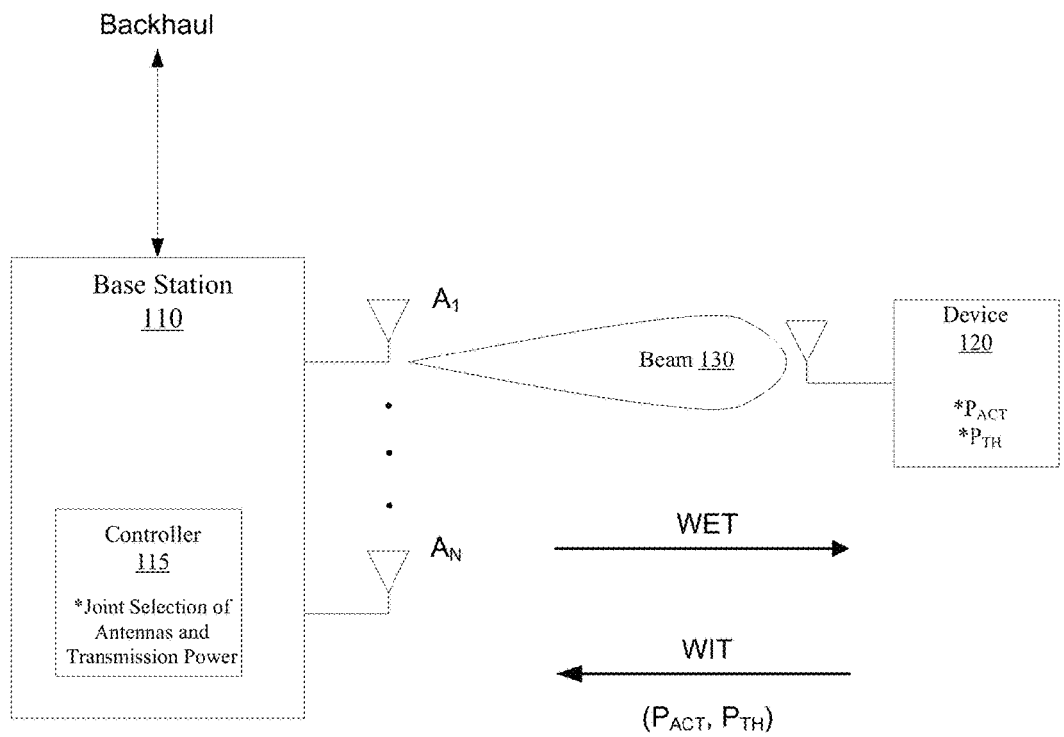
FIG. 1 shows a base station that jointly selects a plurality of antennas and a transmission power level, for transmitting a wireless energy transfer (WET) signal from the base station to a device, according to an embodiment.

FIG. 1 shows a base station 110 that jointly selects a plurality of antennas and a transmission power level, for transmitting a wireless energy transfer (WET) signal from the base station 110 to a device 120, according to an embodiment. For an embodiment, the device 120 is an energy harvesting device that extracts (harvests) energy from received incident wireless signals transmitted by the base station 110. For an embodiment, the device 120 does not have an active power source of its own, and derives energy from the received incident wireless signals.

For an embodiment, energy is transferred to the device by transmitting the WET to the device through multiple transmit antennas. The transmission power level of the WET signals should be great enough to provide enough energy to the device 120 that the device 120 can activate itself. However, the transmission power level should not be so great that energy is wasted.

For at least some embodiments, the device 120 has an activation threshold, wherein the activation threshold is a level of the wireless energy transfer signal needed to activate the device 120. That is, a threshold level of energy that must be transferred from the base station 110 to the device 120 in order for the device 120 to activate itself.

Further, for at least some embodiments, the device 120 also includes a saturation level, wherein the saturation level of the device 120 is a level of the wireless energy transfer signal wherein wireless energy transfer signal energy above this level does not provide additional energy to the device. That is, wireless energy transfer signal energy above this level is wasted.

At least some embodiments include jointly selecting a plurality of antennas and a transmission power level to optimize energy efficiency of the wireless system. For an embodiment, energy efficiency influences the joint selection.

As shown in FIG. 1, the base station 110 includes a plurality of N antennas configured to transmit and receive electromagnetic signals, and a controller 115. The controller is connected to the plurality of N antennas through a plurality of RF (radio frequency) chains. For an embodiment, the controller 115 is configured to jointly select a plurality of M of the plurality of N antennas and a transmission power level, for transmitting a wireless energy transfer (WET) signal from the base station 110 to the device 120 based on the activation threshold of the device and the saturation level of the device. After the joint selection has been made, the WET signal is transmitted from the base station to the device through the jointly selected M antennas at the selected transmission power level. For an embodiment, the number of antennas used to transmit the WET signal and the transmission power level of the WET signal are selected to turn-on the device 120, but low enough that the device 120 does not saturate.

For an embodiment, the WET signal energizes the device 120, and once the device 120 is energized, the device 120 transmits information back to the base station. The information transmitted back can include the activation threshold of the device 120 and the saturation level of the device 120. Further, for at least some embodiments, the information transmitted by the device includes training signals. Further, for at least some embodiments, the information transmitted by device 120 includes other information. For an embodiment, the initial WET signal (that is, before the device has been activated) transmitted to the device is transmitted at a power level that clearly exceeds the threshold of the device (which can be, for example, above a startup threshold) in order to ensure that the device activates. The startup threshold can be higher than the saturation level of the device, and would be a waste of energy if continuously used. Once the device is activated, the device provides enough information for the base station (BS) 110 to determine the activation power level and the threshold power level of the device 120. The BS 110 may then jointly select the plurality of antennas and the transmission power level, for transmitting a wireless energy transfer (WET) signal from the base station 110 to a device 120

Figure 2:
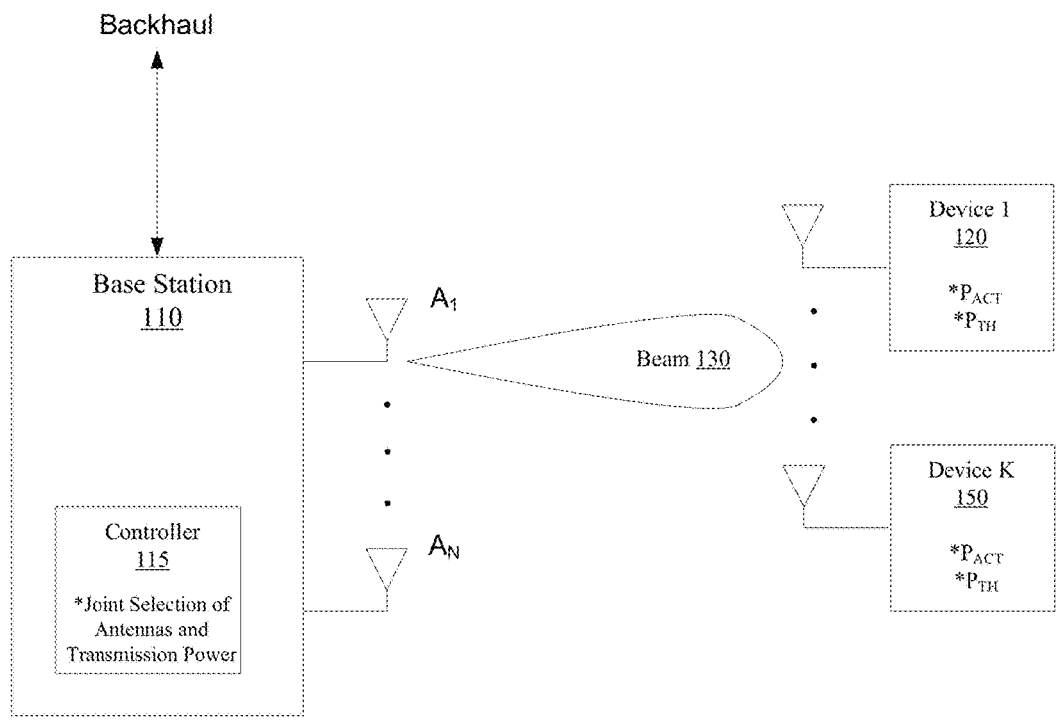
FIG. 2 shows a base station that jointly selects a plurality of antennas and a transmission power level, for transmitting a wireless energy transfer (WET) signal from the base station to a plurality of devices, according to an embodiment.

FIG. 2 shows a base station that jointly selects a plurality of antennas and a transmission power level, for transmitting a wireless energy transfer (WET) signal from the base station to a plurality of K devices, according to an embodiment. For an embodiment, the devices 120, 150 are each equipped with energy harvesting which allows each device to harvest energy from received incident wireless signals transmitted by the base station 110. If multiple devices are simultaneously receiving WET signals from the base station, the cumulative WET signal needs to include enough energy to activate the multiple devices. Accordingly, for an embodiment, the number of devices receiving WET signals from the base station influences the joint selection of the number of transmit antennas and the transmission power level.

Figure 3:
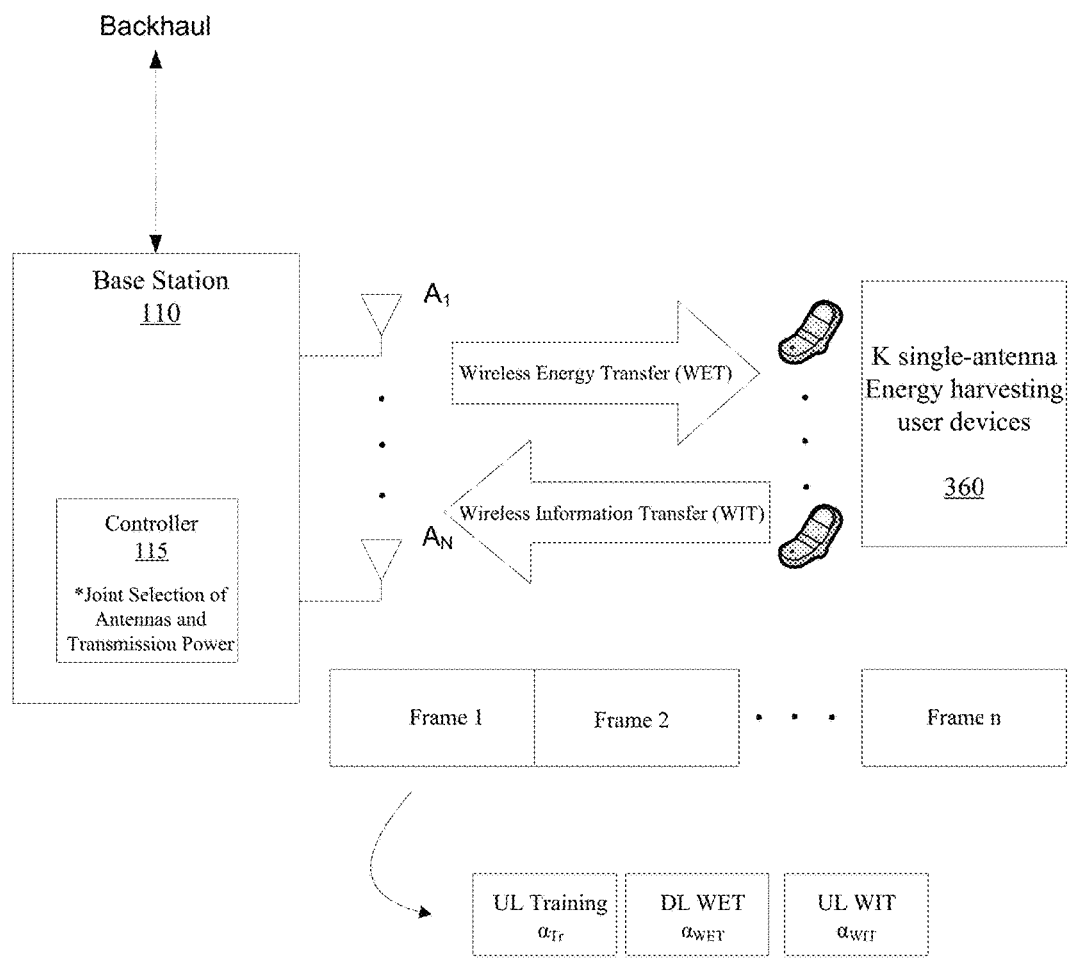
FIG. 3 shows scheduling of a base station that jointly selects a plurality of antennas and a transmission power level, for transmitting a wireless energy transfer (WET) signal from the base station to a plurality of devices, according to an embodiment.

FIG. 3 shows scheduling of a base station that jointly selects a plurality of antennas and a transmission power level, for transmitting a wireless energy transfer (WET) signal from the base station to a plurality of devices, according to an embodiment. For an embodiment, the scheduling includes frames in which frequency and/or time slots are allocated for downlink from the base station to the devices and uplink transmission from the devices to the base station. For an embodiment, the downlink transmission include WET signals from the base station to one or more of the devices, and the uplink transmission include WET signals from one or more of the devices to the base station.

For an embodiment, the downlink and uplink transmission are scheduled within a sequence of frames. For an embodiment, one or more of the sequence of frames includes UL training ($\alpha_{TR}$), downlink (DL) WET ($\alpha_{WET}$), and uplink (UL) WIT ($\alpha_{TR}$). The UL training provides the base station with knowledge of the transmission channel between the base station and the device, which can be used to influence the antenna and transmission power level selection. For an embodiment, the base station transmits a WET signal that activates the devices. Subsequently, the device transmits the UL training signal. Further, the device subsequently transmits uplink information signals.

For at least some embodiments, the joint selection of the plurality of M of the plurality of N antennas and the transmission power level are further based on a percentage or fraction of one or more of the frames that is allocated for WET signals. That is, as previously described, for at least some embodiments, the WET signals and WIT signals are scheduled within frames. A percentage of fraction of the frames may be allocated to WET signals. This allocation influences the amount of energy transferable between the base station and the device. Accordingly, for an embodiment, this allocated percentage of fraction of the frames allocated to WET signals influences the joint selection of the plurality of M of the plurality of N antennas and the transmission power level.

Joint Selection of Antennas and Transmission Power Level

For at least some embodiments, the base station performs the joint selection to optimize or near-optimize an energy efficiency of the wireless energy and information transfer system, wherein the wireless transfer system includes the base station and one or more energy harvesting devices. An exemplary wireless-powered communication system includes a base-station (BS) equipped with M antennas which provides energy to K single-antenna user devices on the downlink. Further, for an embodiment, each user device is equipped with an RF energy harvesting module, and attempts to communicate to the BS on the uplink using the energy extracted from the incident RF signals.

An embodiment includes a TDD (time division duplex) mode of operation including a downlink wireless energy transfer (WET) phase, an uplink wireless information transfer (WIT) phase, and an uplink training phase. For an embodiment, for the TDD system, channel reciprocity is assumed, and it is assumed that the BS has proper channel knowledge, which the BS uses for decoding information on the uplink, and beamforming energy on the downlink. It is assumed, however, that the user devices do not have any channel knowledge. At least some embodiments include defining a channel model. For a channel model, S=TcBc is define as the length of a coherence block or a frame size, where Tc and Bc denote a coherence time and a coherence bandwidth of the wireless channel. For an embodiment, the frame is divided into three phases such that a fraction $\alpha_{Tr}$ $\in(0; 1)$ is reserved for uplink training, $\alpha_{WET} \in (0; 1)$ for wireless energy transfer (WET), and $\alpha_{WIT} \in (0; 1)$ for wireless information transfer (WIT). Moreover, $\alpha_{WET}+\alpha_{WIT}+\alpha_{Tr}=1$. Further, letting hi=[hi1, ... hiM]$^T \in \Box^{M \times 1}$ be defined as the channel from the BS to a user i, where i $\in$ {1, ..., K}. A rich scattering environment is assumed with sufficiently spaced antennas such that hij is a circularly symmetric complex gaussian random variable CN (0, 1), which is independent across i and j. Further, using $\beta_i=Cdi_i^{-\alpha}$ to model the average large-scale fading for user i where di>0 denotes the link distances, $\alpha$>2 is a path loss exponent, and C>0 is a path loss intercept. Further, defining H=[h$_1$, h$_2$, ..., h$_K$] $\in C^{M \times K}$ and G=[g$_1$, g$_2$, ..., g$_K$] $\in \Box^{M \times K}$ such that G=HD$^{1/2}$, where D is diagonal entries ($\beta_1$, ..., $\beta_K$).

At least some embodiments include an energy harvesting model. For an embodiment of the energy harvesting model it is assumed that each user is equipped with an RF energy harvesting module. Prior analysis may assume an ideal energy harvester where the harvested energy scales linearly with the input power. In practice, however, an energy harvester is a nonlinear device with a small operating range, which may lead to vastly different performance trends. For example, not all the incident energy can be harvested; and the harvester output eventually saturates beyond a certain input power. Therefore, the analysis is strengthened by parameterizing the harvester operation using $\{\theta act, \theta sat, \eta_{EH}\}$: where $\theta act$ is the harvester activation threshold (Watts), $\theta sat$ is the harvester saturation threshold (Watts), and $\eta_{EH} \in (0,1]$ s the rectifier efficiency.

Average Received Energy

Analytical expressions for the average harvested energy and the uplink achievable rate for an arbitrary user can be provided, as well as the energy efficiency of the embodiments described. For the average received energy, it is assumed that the BS transmits with the average transmit energy $p_{dl}$ (in joules/symbol) in the downlink. The BS uses a weighted sum of conjugate beamformers for each user in the downlink, since it has been shown to be asymptotically optimal for wireless energy transfer. The precoder $$w_{dl} = \sum_{i=1}^{K} \sqrt{\zeta i} \frac{wi}{\|wi\|}$$

where $wi=g_i$, and $\zeta i \in (0, 1) \; \forall \; i$ such that $\Sigma_{i=1}^{K}\sqrt{\zeta i}=1$. Assuming the BS transmits a signal s with $\overline{E}[|s|^2]=p_{dl}$, the signal $y_i=g_i^H w_{dl}s+ni$ received at user i can be expressed as:

$$y_i = \sqrt{\zeta i} \|gi\|s + \sum_{j=1}^{K} \sqrt{\zeta i} \, g_i^H \frac{gj}{\|gj\|} s + n_i, \quad (1)$$

where $n_i$ is the receiver noise. A user harvests energy from the beam directed towards it, as well as from those directed towards other users. Therefore, the average received energy $\gamma i=\alpha_{WET}E[|yi|2]$ (in joules/symbol) at a user i [6] is given by:

$$\gamma_i=\alpha_{WET}p_{dl}\beta i(\zeta iM+(1-\zeta i)) \quad (2)$$

where the noise term is ignored since it is negligibly small. For simplicity, the results will be specialized to the case of equal energy allocation across users such that $$\zeta i = \frac{1}{K} \forall \; i.$$

Assuming equal energy allocation, the average received energy converges to $\lim_{M,K\to\infty} \gamma i=\alpha_{WET}p_{dl}\beta i (1+r)$ as both M and K grow large with $$\frac{M}{K} = r > 1.$$

Average Harvested Energy

For the proposed nonlinear energy harvesting model, the average harvested energy $\gamma l$ (in joules/symbol) is given by:

$$\acute{\gamma}i = \eta_{EH}\left(\gamma iPr\left[\frac{\theta act}{\alpha WETB} < |yi| \le \frac{\theta sat}{\alpha WETB}\right] + \frac{\theta sat}{B}Pr\left[|yi|^2 > \frac{\theta sat}{\alpha WETB}\right]\right) \quad (3)$$

where the random variable $|\gamma i|^2$ gives the instantaneous received energy (in joules/symbol) at user i. When the activation threshold $\theta act$ is small and the saturation threshold $\theta sat$ is large, the average harvested energy can be approximated as $\eta_{EH}\gamma i$. Note that the harvester thresholds have been normalized by the system bandwidth B as $|\gamma i|^2$ is in joules/symbol. An asymptotic approximation can be provided for the average harvested energy $\acute{\gamma}l$.

Lemma 1: As M grows large, the average harvested energy $\acute{\gamma}l$ for the piecewise linear energy harvesting model can be approximated as $$\acute{\gamma}_i \approx \begin{cases} 0, & M < M_{act} \\ \eta_{EH}\gamma i, & M_{act} \le M \le M_{sat} \\ \frac{\eta_{EH}\theta sat}{B}, & M \ge M_{sat} \end{cases} \quad (4)$$

where $$M_{act} = \left\lceil \frac{\theta act}{\alpha_{WET}B\zeta i\beta ip_{dl}} \right\rceil$$

gives the minimum number of antennas needed for a successful wireless energy transfer, while $$M_{sat} = \left\lceil \frac{\theta sat}{\alpha_{WET}B\zeta i\beta ip_{dl}} \right\rceil$$

gives the minimum number of antennas required to operate the harvester at its maximum potential.

Proof: Using $$\lim_{M\to\infty} \frac{\|g_i\|}{M} \to \beta_k \text{ and } \lim_{M\to\infty} \frac{\|g_i\|}{M} \text{ for } i \ne j \text{ in}, \quad (1)$$

it follows that the random variable $|\gamma i|^2$ hardens to a deterministic value $p_{dl}\zeta iM\beta i$ as $M\to\infty$. Using this asymptotic limit for $|\gamma i|^2$ in (3) yields (4).

Remark 1: On one hand, the BS needs to have at least $M_{act}$ antennas to achieve a nonzero uplink rate and a nonzero energy efficiency, otherwise all the transmitted energy will go waste since it is not sufficient to wake up the users. On the other hand, increasing the BS antennas beyond $M_{sat}$ does not help increase the harvested energy as the users are in the saturated mode (adding more than $M_{sat}$ antennas may still be beneficial for the uplink detection though). This behavior is markedly different from the (misleading) case of a linear energy harvester where the average harvested energy keeps on increasing with M. Also, the thresholds $\{M_{act}, M_{sat}\}$ depend on the downlink transmit power $\alpha_{WET}B\zeta_ip_{dl}$ and the attenuation $\beta i$. It is to be noted that the asymptotic approximation in (4) is fairly accurate for realistic values of M, and is therefore used for analysis.

Uplink Achievable Rate

Defining $\xi i \in (0,1)$ as the fraction of the harvested energy $\acute{\gamma}_l$ at user i reserved for uplink data transmission, while the remaining fraction $1-\xi i$ is used for uplink training. Assuming that a user i transmits with an average transmit energy $p_{ul}^i$ (in joules/symbol) in the uplink. In particular, $p_{ul}^i = \eta_{PA}\xi_i\gamma_l$, where $\eta_{PA} \in (0,1)$ denotes the power amplifier (PA) efficiency at the users. For uplink detection, it is assumed that the BS uses a Zero-forcing (ZF) filter. Using a lower bound (Jensen's inequality) on the ergodic uplink achievable rate at user i for the ensuing analysis [10]. Using (4), the uplink achievable rate can be expressed as $Ri = \alpha_{WTT} B \check{R}_l$ where:

$$\check{R}_l = \begin{cases} 0, & M < M_{act} \\ \log_2\left(1 + \xi_i\frac{\beta_i}{\sigma^2}\gamma i(M-K)\right), & M_{act} \leq M \leq M_{sat} \\ \log_2\left(1 + \xi_i\beta_i\frac{\eta_{EH}\theta sat}{B\sigma^2}(M-K)\right), & M \geq M_{sat} \end{cases} \quad (5)$$

It can be noted that the achievable rate reports a faster growth with M in the non-saturated mode than the saturated mode. This follows from (5) by noting that the term inside the logarithm grows with the square of M in the non-saturated mode, but only linearly in the saturated mode. This is because the average harvested energy no longer increases with M in the saturated mode. Corollary 1: For the case of equal energy allocation across users, that is, $$\zeta_i = \frac{1}{K} \forall i,$$

the uplink achievable rate is given by (5), where the rate in the non-saturated mode simplifies to:

$$\check{R}_l = \log_2\left(1 + p_{dl}\rho_i(M-K)\left(1 + \frac{M-1}{K}\right)\right) \quad (6)$$

where $$\rho_i = \frac{\xi_i\alpha_{WET}\eta EH\beta_i^2}{\sigma^2} \quad (7)$$

and $\sigma^2$ represents the receiver noise at the BS. Note that the final expression is in terms of the downlink transmit energy per symbol $p_{dl}$ since the user uses the harvested energy to transmit its signals. Also, the term $\rho_i$ depends on the square of the average large-scale attenuation $\beta i$. Tuning these fractions wisely could substantially improve performance (or impact the trends) by switching the operating regime of the considered system.

Energy Efficiency

The average case is considered by setting the attenuation $\beta_k$ to the mean attenuation $\check{E}[\beta k] = C \check{E}[d_k^{-\alpha}] \equiv \beta$, where the expectation is over the distance distribution. For simplicity, it is assumed that $\xi_i = \xi \forall i$ and consider the case of equal energy allocation $$\zeta_i = \frac{1}{K} \forall i.$$

Using R is used to denote the resulting rate $R_i \forall i$. Defining the total energy efficiency (EE) of the overall system (in bits/joule) as the ratio of the average uplink sum rate to the total average power consumed, that is:

$$EE(M, K) = \frac{KR}{P_{TX} + P_c} = \frac{KR}{P_{TX} + P_{FIX} + MP_{BS} + P_{CE} + PL_P + AKR} \quad (8)$$

where $P_{TX}$ and $P_c$ respectively denote the total PA power consumption and the total circuit power consumption at the BS. Defining $$P_{TX} = \frac{\alpha_{WET}p_{dl}B}{\eta_{BS}}$$

where $\eta_{BS} \in (0,1)$ is the PA efficiency at the BS. Further, $L_{BS}$ is used to denote the BS computational efficiency in Flops/Watts. Based on [7], the circuit power consumption Pc is allowed to scale with both M and K: $P_{FIX}$ lumps the fixed power spent on running the BS; $P_{BS}$ models the circuit power consumed by an RF chain such that $MP_{BS}$ gives the total power consumed by the antenna circuitry;

$$P_{CE} = \frac{2\alpha_{WIT}MKB}{LBS}$$

models the power consumed while computing the channel estimates on the uplink; $P_{LP}$ accounts for the power consumption due to linear processing at the BS, that is, for computing the energy beamformer for the downlink $$\left(\frac{3MKB}{SL_{BS}}\right)$$

and the ZF filter $$\left(\frac{B\left(\frac{K^3}{3} + 3MK^2 + MK\right)}{SL_{BS}}\right)$$

for the uplink. Finally, AKR models the power consumed in decoding the received signal. Note that the power consumed in computation is usually negligible compared to the antenna power consumption in the massive antenna regime.

Energy Efficiency Optimization

At least some embodiments include an analytical characterization of the system energy efficiency based on system parameters.

Proposition 1: For the non-saturated mode, the EE-optimal transmit power at the BS is given by $$P^* = \frac{\alpha_{WET}Bp_{dl}^*}{\eta_{BS}}$$

where:

$$p_{dl}^* = \frac{e^{1+W\left[\frac{\rho(\acute{C}+M\acute{D})\left(1+\frac{M-1}{K}\right)}{\frac{eB\alpha_{WET}}{\eta_{PA}}}-\frac{1}{e}\right]}}{\rho(M+K)\left(1+\frac{M-1}{K}\right)} \quad (9)$$

and W [•] is the Lambert-W function. The constant $$\acute{C} = P_{FIX} + \frac{B}{3UL_{BS}}K3 \text{ and } \acute{D} = P_{BS} + \frac{2B}{L_{BS}}\left(1+\frac{2}{U}\right)K + \frac{3B}{UL_{BS}}K2.$$

Note that P* is independent of the resource allocation parameters $\{\alpha_{WET}, \alpha_{WIT}, \alpha_{Tr}\}$. P* is also independent of the rate-dependent parameter A. Moreover, the expression in (9) is applicable in the linear mode only. When $p_{dl}^*$ (that is, P*) is too small to activate the node, it is EE optimal to increase the transmit power so as to activate the users, that is, setting $$p_{dl} = \frac{\theta_{act}K}{\alpha_{WET}B\beta i(M-1)}$$

serves the purpose. Similarly, when $p_{dl}^*$ (that is, P*) is sufficiently large to satisfy $$M > Msat = \left\lfloor \frac{\theta_{sat}K}{\alpha_{WET}B\beta ip_{dl}^*} \right\rfloor,$$

reducing the transmit power P to be at least as small as $$\frac{\theta_{sat}K}{\alpha_{WET}B\beta iM}$$

helps improve the energy efficiency. This is because the excess power (beyond what is needed to drive the system in the saturated mode) only increases the power consumption without causing any improvement in the achievable rate.

Further, how the EE-optimal transmit power scales as M and K grow large can be analyzed.

Corollary 2: As M and K grow large such that $$\frac{M}{K} = r > 1,$$

the energy efficiency approximately scales as:

$$p_{dl}^* \approx \eta_{BS}\acute{D}\frac{M}{\ln\left(M^2\left(r-\frac{1}{r}\right)\frac{\eta_{BS}\eta_{EH}(1-\xi)\beta^2}{B\sigma^2}\acute{D}\right)} \quad (10)$$

When M is large, the EE-optimal transmit power scales almost linearly with M. Nonetheless, the maximal energy efficiency eventually vanishes as $M \to \infty$.

Processing According to an Embodiment

An embodiment for the processing for jointly selecting the BS transmit power P and allocating the number of antennas M is proposed in table 1. When the number of antennas is small, the idea is to transmit with a higher power. This ensures that the transmit power is large enough to activate the users, and the resulting EE is non-zero. When the number of antennas is large, we should lower the transmit power to save energy. The energy harvester activation and saturation thresholds can be used for intelligently selection the transmit power given the number of antennas. As described, the activation threshold and the saturation threshold influence the antenna (M) and transmit power level (P) selections.

An embodiment of a selection process of the antenna (M) and transmit power level (P) depicted in Table 1 includes variables of:

K, which is the number of receiving devices.

$\theta_{act}$, which is the activation threshold of the devices.

$\theta_{sat}$, which is the saturation threshold of the devices.

B, which is the bandwidth.

$\beta$, which is a path loss of the channel between the base station and the device.

$\rho$, which is a constant defined by $$\rho_i = \frac{\xi_i \alpha_{WET}\eta EH\beta_i^2}{\sigma^2}.$$

$\acute{C}$, which is a constant that is dependent on the processing power of the BS (base station.

$\acute{D}$, which is a constant that is dependent on the processing power of the BS (base station.

$\eta_{PA}$, which is the power amplifier (PA) efficiency at the users.

$\alpha_{WET}$, which represents a fraction of a frame allocated for WET.

EE, which is the energy efficiency.

TABLE 1

(Processing Steps of an Embodiment for Selecting the antenna (M) and transmit power level (P))

Inputs to the Processing: K, $\theta_{act}$, $\theta_{sat}$, B, $\beta$, $\rho$, $\acute{C}$, $\acute{D}$, $\eta_{PA}$, $\alpha_{WET}$
Processing Initialization: M ← K + 1, flag ← 0, $EE_{old}$ ← 1
While flag = 1;
Update:

$$P_{act} \leftarrow \frac{K\theta_{act}}{\alpha_{WET}B\beta(M-1)}$$

$$P_{sat} \leftarrow \frac{K\theta_{sat}}{\alpha_{WET}B\beta(M+1)}$$

$$P_{dl} \leftarrow \frac{e^{1+W\left[\frac{\rho(\acute{C}+M\acute{D})\left(1+\frac{M-1}{K}\right)}{\frac{eB\alpha_{WET}}{\eta_{PA}}}-\frac{1}{e}\right]}}{\rho(M+K)\left(1+\frac{M-1}{K}\right)}$$

$$M_{act} \leftarrow \left\lceil \frac{\theta_{act}}{\alpha_{WET}B\beta p_{dl}} \right\rceil$$

$$M_{sat} \leftarrow \left\lfloor \frac{K\theta_{sat}}{\alpha_{WET}B\beta ip_{dl}} \right\rfloor$$

TABLE 1-continued (Processing Steps of an Embodiment for Selecting the antenna (M) and transmit power level (P))

```
If M > M_sat
    p_dl ← min (p_sat, p_dl)
else
    p_dl ← max (p_act, p_dl)
end.
Compute the energy efficiency EE (M, p_dl) from the above processing
steps, and the loop over values of M until a drop in energy efficiency is
determined.
If EE_old > EE (M, p_dl)
    flag ← 0
else
    EE_old ← EE (M, p_dl)
    M ← M + 1
end
    P* ← α_WET p_dl B
    M* ← M
Select and output: P*, M*.
end.
```

For an embodiment, the selected and output M*, P* are used as the antenna number and power level selections of the base station.

For at least some embodiments, transmit precoders are used at the BS for transmitting WET signal (also called energy beamforming). For an embodiment, a weighted linear combination of the conjugate beamformers are used for each users' channel. For an embodiment, it is assumed that the BS allocates energy uniformly among the users (that is, the weights of each user are set to 1/K where K is the number of users). It has been shown to be asymptotically optimal for wireless energy transfer (that is, when the number of antennas go to infinity), that is, the wireless energy transfer maximizes the average energy transferred to the users.

For an embodiment, a zero-forcing receive filter is used at the BS for uplink transmission as well.

Figure 4:
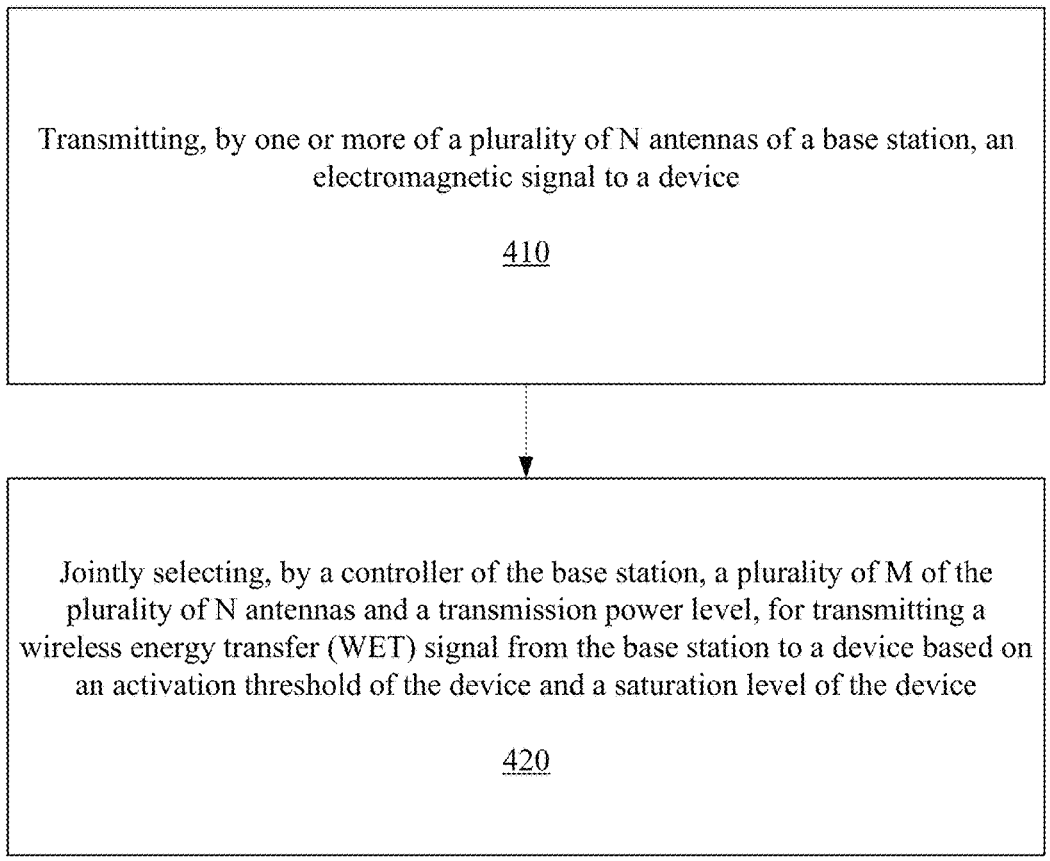
FIG. 4 is a flow chart that includes steps of a method of jointly selecting a plurality of antennas and a transmission power level, for transmitting a wireless energy transfer (WET) signal from the base station to a device, according to an embodiment.

FIG. 4 is a flow chart that includes steps of a method of jointly selecting a plurality of antennas and a transmission power level, for transmitting a wireless energy transfer (WET) signal from the base station to a device, according to an embodiment. A first step 410 includes transmitting, by one or more of a plurality of N antennas of a base station, an electromagnetic signal to a device. A second step 420 includes jointly selecting, by a controller of the base station, a plurality of M of the plurality of N antennas and a transmission power level, for transmitting a wireless energy transfer (WET) signal from the base station to a device based on an activation threshold of the device and a saturation level of the device.

As previously described, for an embodiment, the base station performs the joint selection to optimize or near-optimize an energy efficiency of the wireless transfer system, wherein the wireless transfer system includes the base station and one or more energy harvesting devices.

As previously described, for an embodiment, the activation threshold is a level of the wireless energy transfer signal needed to activate the device. The device will not active for received signal energy below the activation threshold.

As previously described, for an embodiment, the saturation level of the device is a level of the wireless energy transfer signal wherein wireless energy transfer signal energy above this level does not provide additional energy to the device. Energy received above this threshold is essentially wasted energy. Therefore, energy received above this threshold reduces the energy efficiency of the wireless energy transfer system.

As previously described, for an embodiment, the base station determines the activation threshold of the device and the saturation level of the device based on uplink communication from the device to the base station. For example, once activated, the device transmits uplink information which can include the activation threshold of the device and the saturation level of the device. For an embodiment, an initial wireless signal transmitted from the base station includes an energy threshold that is clearly above the activation threshold of the device. Once the device is activated, the device transmits uplink information to the base station. This information can include information that allows the base station to determine the activation threshold of the device and the saturation level of the device. Once the base station has the activation threshold of the device and the saturation level of the device, the base station can then jointly select the plurality of M of the plurality of N antennas and the transmission power level, for transmitting a wireless energy transfer (WET) signal from the base station to a device based on the activation threshold of the device and the saturation level of the device. For an embodiment, the information received from the device includes an identifier of the device, and the base station then accesses information that provides the activation threshold of the device and the saturation level of the device. For example, the controller of the base station can access a look up table.

At least some embodiments further include jointly selecting the plurality of M of the plurality of N antennas and the transmission power level based on a channel estimate of a communication channel between the base station and the device. That is, channel conditions of the wireless channel between the base station and the device influence the transmission of the WET signals. The influences can be compensated for by influencing the joint selection of the plurality of M of the plurality of N antennas and the transmission power level based on a channel estimate.

For at least some embodiments, the channel estimate is determined based on a training signal within at least a portion of the uplink communication from the device to the base station. That is, once activated, for an embodiment, the device transmits a training signal on uplink communication to the base station. The base station receives the training signal, and is able to estimate the channel between the base station and the device. If the down link WET signal are transmitted at a common frequency channel as the WIT uplink signals, the channel can be assumed to be reciprocal, and the uplink channel can use the estimated channel of the uplink to aid in the joint selection of the plurality of M of the plurality of N antennas and the transmission power level based on a channel estimate.

As previously described, for an embodiment, the downlink wireless energy transfer (WET) signals and uplink wireless information transfer (WIT) signals are scheduled according to frames. That is, the wireless signals communicated between the base station and the device include time and/or frequency blocks within frames, and WET and WIT signals are scheduled within the time and/or frequency blocks of the frames.

As previously described, for at least some embodiments, the joint selection of the plurality of M of the plurality of N antennas and the transmission power level are further based on a percentage or fraction of one or more of the frames that is allocated for WET signals. That is, as previously described, for at least some embodiments, the WET signals and WIT signals are scheduled within frames. A percentage of fraction of the frames may be allocated to WET signals. This allocation influences the amount of energy transferable between the base station and the device. Accordingly, for an embodiment, this allocated percentage of fraction of the frames allocated to WET signals influences the joint selection of the plurality of M of the plurality of N antennas and the transmission power level.

As previously described, for at least some embodiments, the base station simultaneously transfers WET signals to multiple devices. Each of the devices requires at least the activation threshold of energy to activate. Accordingly, for an embodiment, the energy of the WET signal is adjusted based upon the number of devices receiving the WET signals. That is, for an embodiment, joint selection of the plurality of M of the plurality of N antennas and the transmission power level is based on a number of devices receiving the WET signals, and communicating with the base station.

The bandwidth of the channel in which the base station communicates with the device influences the energy transferred from the base station to the device. Accordingly, for an embodiment, the joint selection the plurality of M of the plurality of N antennas and the transmission power level is further based on a system bandwidth between base station and the device.

The base station includes a power amplifier that amplifies wireless signal transmitted by the base station. The efficiency of the power amplifier influences the energy transfer through wireless signal transmitted from the base station to the device. Accordingly, for an embodiment, the joint selection the plurality of M of the plurality of N antennas and the transmission power level is further based on an efficiency of a power amplifier of the base station.

Although specific embodiments have been described and illustrated, the embodiments are not to be limited to the specific forms or arrangements of parts so described and illustrated. The described embodiments are to only be limited by the claims.

What is claimed:

1. A base station, comprising:
    a plurality of N antennas configured to transmit and receive electromagnetic signals;
    wherein the base station is configured to:
        transmit electromagnetic signals to a device through the plurality of N antennas at a power level that is above a startup threshold;
        receive an activation threshold and a saturation level of the device from the device after the base station transmits the electromagnetic signals through the N antennas at the power level above the startup threshold, wherein the startup threshold is greater than the saturation level;
    a controller, wherein the controller is configured to:
        jointly select a plurality of M of the plurality of N antennas and a transmission power level, for transmitting a wireless energy transfer (WET) signal from the base station to device based on the received activation threshold of the device and the received-saturation level of the device;
    and wherein the base station is further configured to:
        transmits the WET signal to the device at the selected transmission power level through the selected M antennas;
        receive an uplink wireless information transfer (WIT) from the device through the selected M antennas.

2. The base station of claim 1, wherein the activation threshold is a level of the wireless energy transfer signal needed to activate the device.

3. The base station of claim 1, wherein the saturation level of the device is a level of the wireless energy transfer signal wherein wireless energy transfer signal energy above this level does not provide additional energy to the device.

4. The base station of claim 1, wherein the base station receives the activation threshold of the device and the saturation level of the device based on the uplink WIT signal from the device.

5. The base station of claim 4, wherein the base station is further configured to jointly select the plurality of M of the plurality of N antennas and the transmission power level based on a channel estimate of a communication channel between the base station and the device.

6. The base station of claim 5, wherein the controller is further configured to determine the channel estimate based on a training signal within at least a portion of the uplink communication from the device to the base station.

7. The base station of claim 1, wherein downlink wireless energy transfer (WET) signals and uplink wireless information transfer (WIT) signals are scheduled according to frames, wherein at least one of the scheduled frames is divided into a downlink WET signal, an uplink training signal, and an uplink WIT signals; and wherein the uplink training signal provides the base station with knowledge of the transmission channel.

8. The base station of claim 7, wherein the base station is further configured to jointly select the plurality of M of the plurality of N antennas and the transmission power level based on a percentage or fraction of one or more of the frames that is allocated for WET signals.

9. The base station of claim 7, wherein the base station is further configured to use the knowledge of the transmission channel to transmit beam formed energy to the device at the selected transmission power level through the selected M antennas, and wherein the base station uses the knowledge of the transmission channel to decode information in the uplink wireless information transfer (WIT) from the device through the selected M antennas.

10. The base station of claim 1, wherein the base station is further configured to jointly select the plurality of M of the plurality of N antennas and the transmission power level based on a number of devices communicating with the base station.

11. The base station of claim 1, wherein the base station is further configured to jointly select the plurality of M of the plurality of N antennas and the transmission power level based on a system bandwidth between base station and the device.

12. The base station of claim 1, wherein the base station is further configured to jointly select the plurality of M of the plurality of N antennas and the transmission power level based on an efficiency of a power amplifier of the base station.

13. The base station of claim 1, wherein a fraction of at least one scheduled frame is reserved the downlink WET signal, a fraction of the at least one scheduled frame is reserved the uplink training signal, and a fraction of the at least one scheduled frame is reserved the uplink WIT signals, wherein the fraction of the at least one scheduled frame reserved for the downlink WET signal, the fraction of the at least one scheduled frame reserved for the uplink training signal, and the fraction of the at least one scheduled frame reserved for the uplink WIT signals, sum to equal one.

14. A method, comprising:
    transmitting, by one or more of a plurality of N antennas of a base station, an electromagnetic signal to a device at a power level above that is above a startup threshold;

receiving, by the base station, an activation threshold and a saturation level of the device from the device after the base station transmits the electromagnetic signals through the N antennas at the power level that is above the startup threshold, wherein the startup threshold is greater than the saturation level;

jointly selecting, by a controller of the base station, a plurality of M of the plurality of N antennas and a transmission power level, for transmitting a wireless energy transfer (WET) signal from the base station to the device based on the received activation threshold of the device and the received saturation level of the device; and transmitting, by the base station, the WET signal to the device at the selected transmission power level through the selected M antennas.

15. The method of claim 14, wherein the activation threshold of the device and the saturation level of the device are received based on uplink communication from the device to the base station.

16. The method of claim 14, wherein the jointly selecting, by the controller of the base station, the plurality of M of the plurality of N antennas and the transmission power level is further based on a channel estimate of a communication channel between the base station and the device.

17. The method of claim 14, wherein downlink wireless energy transfer (WET) signals and uplink wireless information transfer (WIT) signals are scheduled according to frames.

18. The method of claim 17, wherein the jointly selecting, by the controller of the base station, the plurality of M of the plurality of N antennas and the transmission power level is further based on a percentage or fraction of one or more of the frames that is allocated for WET signals.

19. The method of claim 14, wherein the jointly selecting, by the controller of the base station, the plurality of M of the plurality of N antennas and the transmission power level is further based on an efficiency of a power amplifier of the base station.

* * * * *